(12) United States Patent
Ito

(10) Patent No.: US 8,280,243 B2
(45) Date of Patent: Oct. 2, 2012

(54) OPTICAL COMMUNICATION TRANSMISSION SYSTEM AND METHOD FOR CHECKING PERFORMANCE OF OPTICAL COMMUNICATION TRANSMISSION SYSTEM

(75) Inventor: Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 12/673,795

(22) PCT Filed: Sep. 18, 2008

(86) PCT No.: PCT/JP2008/066844
§ 371 (c)(1),
(2), (4) Date: Feb. 17, 2010

(87) PCT Pub. No.: WO2009/038121
PCT Pub. Date: Mar. 26, 2009

(65) Prior Publication Data
US 2011/0069950 A1    Mar. 24, 2011

(30) Foreign Application Priority Data

Sep. 20, 2007   (JP) ................................ 2007-243820

(51) Int. Cl.
*H04B 10/08* (2006.01)
*H04B 17/00* (2006.01)
(52) U.S. Cl. .............................................. 398/2; 398/9
(58) Field of Classification Search .................. 398/2, 9
See application file for complete search history.

(56) References Cited

FOREIGN PATENT DOCUMENTS

| JP | 63-151126 A | 6/1986 |
|---|---|---|
| JP | 1-318323 A | 12/1989 |
| JP | 4-345324 A | 12/1992 |
| JP | 2002033703 A | 1/2002 |
| JP | 2002190775 A | 7/2002 |
| JP | 2006067444 A | 3/2006 |

OTHER PUBLICATIONS

International Search Report for PCT/JP2008/066844 mailed Oct. 21, 2008.

*Primary Examiner* — Shi K Li

(57) ABSTRACT

To detect the performance degradation of an optical communication transmission system after it becoming operational, thereby preventing the reliability of the system from lowering. In an optical communication transmission system, one of optical transmitter-receivers in a redundant-structured system is an active optical transmitter-receiver, and the other optical transmitter-receiver is a standby optical transmitter-receiver. The optical transmitter-receiver includes a loopback device through which the signal light of a transmitting section of the optical transmitter-receivers is inputted to a receiving section, and an operating-system switching scheduling device for regularly switching the operating system is provided. Further, there is also provided a performance check scheduling device which operates the loopback device of the standby-system optical transmitter-receiver at a prescribed timing determined in advance to start the performance check processing by the transmitting section and the receiving section of the optical transmitter-receiver.

9 Claims, 14 Drawing Sheets

OPTICAL COMMUNICATION TRANSMISSION SYSTEM AND METHOD FOR CHECKING PERFORMANCE OF OPTICAL COMMUNICATION TRANSMISSION SYSTEM

TECHNICAL FIELD

The present invention relates to an optical communication transmission system and a method for checking performances of the optical communication transmission system. More specifically, the present invention relates to an optical communication transmission system and a method for checking performances of the optical communication transmission system, which can increase the reliability by executing detection of performance degradation even after optical transmitter-receivers are being employed.

BACKGROUND ART

An optical communication transmission system which uses an optical fiber as a transmission path medium carries out an important role in a backbone communication network based on its long-distance transmission capability and large-volume transmission capability.

As one of the indicators for the economical efficiency of the optical communication transmission system, there is a way of determining it based on how many transmission signals can be shared with an optical fiber as a transmission path and a relay optical amplifier. The wavelength division multiplex optical transmission technology is a technique which can easily increase the signal total capacitance with a single optical fiber, so that it is employed to most of the backbone transmission system that is required to perform great amount of transmissions. The mainstream of the signal speed per wavelength used currently on commercial systems is 2.5 Gb/s or 10 Gb/s. However, it is expected to improve the signal speed up to 40 Gb/s or 100 Gb/s, for example.

If the signal speed is to be increased without improving the capacity of the transfer path, it becomes difficult to design the structure of the transmitter-receiver in accordance with the increased operation speed. Further, influences of the various signal quality degradations generated within the optical fiber as the transmission path become more prominent. That is, the technique regarding the transmitter-receiver and the optical fiber becomes complicated.

In order to cope with the degradations of the receiving sensitivity caused due to the increased transfer speed, it is desired to employ a modulation-demodulation method which is excellent in the receiving sensitivity. For the optical communication transmission system whose signal speed is 10 Gb/s or below, a simple IM/DD (Intensity Modulation/Direct Detection) method which superimposes a signal on the intensity of the signal light has been the mainstream. However, for the optical communication transmission system whose signal speed is 40 Gb/s or more, it has been studied to employ a method which superimposes information not only to the intensity of the signal light but also to the phase in a dividing manner.

Further, influences of the accumulation of the wavelength dispersions become heavier in accordance with the increased signal speed. It becomes necessary to have a slight compensation for each wavelength, for example, while conventionally the multiple-wave lights can be compensated collectively. In a case where the compensation is performed for each wavelength, a compensator is loaded inside each optical transmitter-receiver. Further, same processing as that of the wavelength dispersions is to be conducted for polarization dispersions.

As a related literature where the invention related to the present invention is depicted, there is Patent Document 1.
Patent Document 1: Japanese Unexamined Patent Publication 2002-33703

DISCLOSURE OF THE INVENTION

Problems to be Solved by the Invention

As described above, in order to increase the signal speed in the optical communication transmission system, the number of components is greatly increased since it becomes necessary to use a sophisticated demodulation method and to employ the compensation technique for various degradation main factors to the inside the transmitter-receiver. When the number of components is increased, it becomes difficult to secure the reliability as the entire system. That is, the reliability of the optical communication transmission system may be deteriorated in accordance with the degradation in the performance caused by chronological changes of each component. The performance degradations herein include two following meanings. One is the performance degradation caused due to the quality degradation of the components themselves such as the chronological changes, and the other is the performance degradation caused due to inconsistency in the coordinated actions between the components.

With a conventional optical communication transmission system, as a general rule, the operation is not terminated once the operation is started. Thus, it is difficult to detect in advance the deterioration of the reliability caused due to the performance degradation so as to avoid the deterioration of the reliability.

It is therefore an object of the present invention to provide an optical communication transmission system which can avoid deterioration of the reliability of the system by detecting the performance degradation after operating the optical communication transmission system, and to provide a method for checking the performance of the optical communication transmission system.

Disclosure of the Invention

The optical communication transmission system according to the present invention is an optical communication transmission system in which one of optical transmitter-receivers of a redundant structure is an operating-system optical transmitter-receiver and another one of the optical transmitter-receivers is a standby-system optical transmitter-receiver. The optical communication transmission system includes: a loopback device which inputs signal light of a transmitting section of the optical transmitter-receiver to a receiving section thereof; an operating-system switching scheduling device which switches the operating-system transmitter-receiver and the standby-system optical transmitter-receiver; and a performance check scheduling device which operates the loopback device of the standby-system optical transmitter-receiver, and starts performance check processing by the transmitting section and the receiving section of the optical transmitter-receiver.

The optical communication transmission system performance check method according to the present invention is a method for checking performance of an optical communication transmission system in which one of optical transmitter-receivers of a redundant structure is an operating-system optical transmitter-receiver and another one of the optical transmitter-receivers is a standby-system optical transmitter-receiver. The method includes: operating a loopback device of the standby-system optical transmitter-receiver, and starting performance check processing by a transmitting section and a receiving section of the optical transmitter-receiver.

Means for Solving the Problems

The present invention makes it possible to detect the performance degradations regularly after operating the optical communication transmission system, so that it is possible to avoid deterioration of the reliability of the system.

BEST MODES FOR CARRYING OUT THE INVENTION

Hereinafter, exemplary embodiments of the invention will be described in detail by referring to the drawings.

In order to detect the deterioration of the reliability after starting operations of an optical communication transmission system, two independent approaches are necessary. One is to establish a method for checking the performance of a transmitter-receiver. The other is to execute the established transmitter-receiver performance check method during the operation time. Each approach will be described hereinafter.

For checking the performance of the transmitter-receiver, it is the most typical and easiest way to use the signal light itself that has traveled from a distant place. For example, it is possible to predict changes in the performance to some extent from changes in the code error rate of the signal light after transmission, etc. However, when there is performance degradation, it is not possible with the method using the transmitted signal light to specify where (in the transmitting section within the transmitter-receiver in the distant place, the optical fiber as the transmission path, or within the receiving section of the transmitter-receiver as the target of the performance check) the cause of the generated performance degradation is generated. That is, it is difficult to immediately specify that the changes in the performance are generated within the transmitter-receiver. As a result, it takes time to devise countermeasures to the performance degradation.

Thus, there is considered a case where the performance check of the transmitter-receiver is conducted in the transmitter-receiver by having the signal light transmitted from the receiving section make incident directly on the receiving section. In order to have the signal light transmitted from the transmitting section make incident directly on the receiving section, it is necessary to provide a loopback mechanism using an optical switch inside the transmitter-receiver. While checking the performance, the receiving section cannot receive the signal light transmitted from the distant place. Thus, the function as the transmission is shut down. The countermeasure for that will be described later.

When the signal light transmitted from the transmitting section makes incident directly on the receiving section, the transmitter-receiver simply becomes error free unless it is not broken. Thus, it is possible to check the operations of digital sections of the transmitting section and receiving section. However, it is difficult to check the occurrence of performance degradations in analog sections of the transmitting section and the receiving section. Thus, when a dispersion compensator to which a variable mechanism is built-in is loaded on the receiving section, for example, the relation between the dispersion compensation amount and the code error rate is investigated by changing the compensation amount. When the dispersion compensator to which a variable mechanism is built-in is not loaded on the receiving section, an error-free area created by changing the phase and level of the discriminating point of a code discriminator or the like becomes an effective performance check item, for example. When the result obtained by checking the performance differs from the result obtained at the time of being shipped from factories, it is judged that there is an occurrence of performance degradation.

Even if the performance degradation becomes apparent by using this approach, it is not possible to immediately distinguish whether the cause thereof is on the transmitting section or the receiving section. However, normally, the both are within a same casing, so that it is not possible to exchange only one of those. Considering that, it is not practically an issue even if the place of having the performance degradation cannot be specified immediately.

Next, the other approach, which is to perform the transmitter-receiver performance check method during the operation time, will be described. In general, the backbone optical communication system is provided with a double or triple redundant system structure in case for having a cut in the optical fiber as the transmission path. Therefore, the performance check test described above is conducted on the system that is not used as the active system (operating system) among the plurality of systems.

Normally, the active system to which the signal is being transmitted and the standby system are switched only when a problem occurs. However, it is assumed in the exemplary embodiment to conduct the switching regularly for checking the performance of the transmitter-receiver. Through switching the systems frequently and checking the changes in the performance by the above-described performance check method every time the switching. is conducted, the state of performance changes can be checked up diligently.

FIG. 1 is a block diagram showing a schematic structure of an optical transmitter-receiver of the optical communication transmission system according to the exemplary embodiment of the invention. As shown in FIG. 1, in the redundant-structured optical transmitter-receivers of the optical communication transmission system according to the exemplary embodiment of the invention, one of optical transmitter-receivers in the redundant-structured system, 101a, is an active optical transmitter-receiver, and the other optical transmitter-receiver, 102a, is a standby optical transmitter-receiver. The optical transmitter-receiver includes a loopback device 103 through which the signal light of a transmitting section 101 of the optical transmitter-receivers 101a, 102a is inputted to a receiving section 102, and an operating-system switching scheduling device 104 for regularly switching the operating system is provided. Further, there is also provided a performance check scheduling device 105 which operates the loopback device 103 of the standby-system optical transmitter-receiver at a prescribed timing determined in advance to start the performance check processing by the transmitting section and the receiving section of the optical transmitter-receiver. A switch 1101 supplies input signals to the optical transmitter-receivers 101a, 102a according to an instruction of the operating-system switching scheduling device 104, selects signals from the optical transmitter-receiver 101a or the optical transmitter-receiver 102a, and outputs the signals as reception signals.

Next, action timings in the structure of the transmitter-receiver of the optical communication transmission system according to the exemplary embodiment will be described.

FIG. 2 is a block diagram showing a typical structure of a backbone optical communication transmission system. The optical communication transmission system in which optical transmission devices 1 and 2 provided respectively at two points are communicably connected to each other employs a redundant structure for an optical fiber 3 and the optical transmission devices 1, 2 for improving the reliability. FIG. 2 illustrates an example of a three-system redundant structure. In the case of redundant structure, the system that is actually used is called "active", and the other systems are called "standby". In the case shown in FIG. 2, the path for using the optical transmitter-receiver 101*a* of the optical transmission device 1 and the optical transmitter-receiver 101*b* of the optical transmission device 2 is active.

That is, in the optical transmission device 1, the optical transmitter-receiver 101*a* is the "active"-system optical transmitter-receiver, and the optical transmitter-receivers 102*a*, 103*a* are the "standby"-system optical transmitter-receivers. In the optical transmission device 2, the optical transmitter-receiver 101*b* is the "active"-system optical transmitter-receiver, and the optical transmitter-receivers 102*b*, 103*b* are the "standby"-system optical transmitter-receivers. Further, the switch 1101 supplies input signals to the optical transmitter-receiver 101*a*, selects signals from the optical transmitter-receiver 101*a*, and outputs the signals as reception signals. A switch 1102 selects signals from the optical transmitter-receiver 101*b*, outputs the signals as reception signals, and supplies the input signals to the optical transmitter-receiver 101*b*. As will be described later, there are cases where the switch 1101 is structured to supply the input signals also to the optical transmitter-receivers 102*a*, 103*a* of the "standby" system, and the switch 1102 is structured to supply the input signals also to the optical transmitter-receivers 102*b*, 103*b* of the "standby" system.

There are various methods for switching the active system and the standby system. FIG. 3 is an explanatory diagram showing an example of the switching timings in the transmission system (optical communication transmission system) which uses the two systems (communication system a and communication system b). In the transmission system shown in FIG. 3, the communication system a is set to active normally, and the active system is switched from the communication system a to the communication system b only when there is a fault. In the case shown in FIG. 3, a fault occurs at time t1, and the active system is switched from the communication system a to the communication system b. At time t2 where the processing for recovering from the fault is completed, the communication system a is returned back to the active system. Further, a fault occurs again in the communication system a at time t3, and the active system is switched from the communication system a to the communication system b. At time t4 where the processing for recovering from the fault is completed, the communication system a is switched back again to the active system. In FIG. 3, a triangle mark indicates an occurrence of fault, and a circle mark indicates a recovery from the fault. This is the same in FIG. 4 and FIG. 5 as well.

FIG. 4 is an explanatory diagram showing another example of the switching timings in the transmission system which uses the two systems (communication system a and communication system b). This system does not preferentially set one of the systems to an active system. In the transmission system shown in FIG. 4, the communication system a is set to an active system at time t0. However, a fault occurs at time t1, and the active system is switched from the communication system a to the communication system b. Even after the communication system a recovers from the fault, the communication system b continues to be used as the active system until a fault occurs in the communication system b at time t2.

FIG. 5 is an explanatory diagram showing still another example of the switching timings in the transmission system which uses the two systems (communication system a and communication system b). In the transmission system shown in FIG. 5, active-standby switching is conducted regularly in addition to the switching conducted when there is a fault. FIG. 5 shows a state where switching is conducted regularly at time t1-time t4, and switching is conducted at time t5 due to an occurrence of fault.

The exemplary embodiment basically uses the switching timings shown in FIG. 5 as the active-standby switching timings. The reason for using the switching timings shown in FIG. 5 is that it is necessary for the transmitter-receiver to be in a standby state regularly irrespective of the occurrence of the fault in order to check the performance regularly.

FIG. 6 is an explanatory diagram showing the timings for executing the performance check in the transmission system of the exemplary embodiment which uses the switching timings shown in FIG. 5. As shown in FIG. 6, it is preferable to execute the performance check twice or more in one standby period (FIG. 6 shows a case of executing it twice). In FIG. 6, rectangles in black at t2-t3 and t4-t5 show the periods where the performance check is executed. This is the same in FIG. 7 as well.

In the case shown in FIG. 6, when it comes to a standby state at time t1, a performance check work is started almost immediately after time t2 (end time: t3). The first performance check is executed in order to check the existence of the performance degradation generated before time t1. When degradation is found by the first performance check, a measure is taken before reaching time t6 that is a next switching timing.

The second performance check is executed at time t4 immediately before the switching time t6. The second performance check is executed in order to check the existence of a problem regarding the use of the system as the active system after time t6. Thus, when degradation is found by the second performance check, active-standby switching is not conducted at time t6.

In order to promptly execute the switching when there is a fault generated in the active system, the actual signals themselves (not the signals for the performance check, but the signals that are to be transmitted between two points) are normally transmitted also to the systems that are in a standby state. In a case of such structure, the signals are not transmitted during the period where the performance check is conducted in the standby system, so that it cannot be considered being in a standby state in a strict sense. However, the regular switching interval (one year, for example) is longer than the time (ten minutes, for example) required for the performance check, so that the reliability is not deteriorated so much even when the performance check of the exemplary embodiment is executed. However, in order to avoid deterioration of the reliability caused due to the performance check as much as possible, a transmission system including a total of three systems may be built by providing two redundant systems, for example.

FIG. 7 is an explanatory diagram showing the timings for the active-standby switching and the performance check of a case which uses the three systems including a communication system a, a communication system b, and a communication system c. As shown in FIG. 7, through shifting the timings of the performance check of the two inactive systems, it is possible to avoid having a period in which the signals are not transmitted to the standby system under a standby state. This makes it possible to avoid deterioration of the reliability caused due to the performance check. That is, the performance check scheduling device controls the timings in such a manner that the execution timings of the performance check processing executed in each of a plurality of standby-system optical transmitter-receivers do not overlap with each other.

Next, the method for checking the performance according to the exemplary embodiment will be described in a specific manner.

FIG. 8 is a block diagram showing the structure of the transmitter-receiver (optical transmitter-receiver) of the transmission system according to the exemplary embodiment. As shown in FIG. 8, a part of the signal light transmitted from the transmitting section 101 of the transmitter-receiver 100 is latched by an optical coupler 110 for checking the performance. An optical switch 111 is disposed on the input side of the receiving section 102 of the transmitter-receiver 100. The transmitter-receiver 100 corresponds to each of the optical transmitter-receivers 101a, 102a, 103a, 101b, 102b, and 103b shown in FIG. 2.

The optical switch 111 is structured to select the signal light reached via the transmission path or the signal light arrived from the transmitting section 101 via the optical coupler 110 and a loopback circuit 120. With the structure shown in FIG. 8, the signal light is transmitted also during the performance check work. If that causes an issue, an optical switch 112 may be provided as in FIG. 9 instead of the optical coupler 110 shown in FIG. 8. The optical switch 112 is set to prevent the signal light from being outputted to the transmission path while checking the performance. That is, it is controlled to send the signal light transmitted from the transmitting section 101 only to the loopback circuit 120. Further, in the structure shown in FIG. 8, the loopback device includes the optical coupler 110, the loopback circuit 120, and the optical switch 111. In the structure shown in FIG. 9, the loopback device includes the optical switch 112, the loopback circuit 120, and the optical switch 111.

FIG. 10 is a flowchart showing the procedure of the performance check according to the exemplary embodiment. In FIG. 10, reference codes (A)-(U) are allotted to each process shown by each block for discriminating the processes. Before describing the specific procedure, terms used therefore will be described. "Part irrelevant to distortion correction" in block (E) means a part that is necessary to have adjustment (adjustment of center wavelength in a case of demodulation interferometer) regardless of the presence of signal distortions as in the demodulation interferometer (an example of a device which requires adjustment irrespective of distortion correction of the signal light) which is provided to the receiving section 102 when the phase modulation method is used as the modulation method, for example. In most of cases using the normal IM/DD method, there is no "part irrelevant to distortion correction" which requires this adjustment.

"Distortion correcting mechanism" in (G)-(N) is something like a wavelength dispersion compensator having a variable mechanism, for example. In this exemplary embodiment, it is assumed that there are two "distortion correcting mechanisms" (distortion correcting mechanisms (1) and (2)). The contents of "performance checkup" seen at every turn in FIG. 10 will be described later.

Next, the procedure of the performance check shown in FIG. 10 will be described. Here, it is assumed to use the transmitter-receiver (optical transmitter-receiver) 100 having the basic structure shown in FIG. 8 or FIG. 9. When the transmitter-receiver 100 (see (A) in FIG. 10) in a standby state receives a command for checking the performance from outside the transmitter-receiver 100 at a prescribed timing, i.e., at a timing of the performance check, from a device or the like which has a function of scheduling the performance check timings (for example, a function which judges whether or not it has come to a preset performance check timing by conducting prescribed clocking), the performance check is started at the transmitter-receiver 100 (see (B) in FIG. 10). When starting the performance check, the transmitter-receiver 100 switches the optical switches (the optical switches 111, 112 in the structure shown in FIG. 9) to directly input the signal light outputted from the transmitting section 101 to the receiving section 102 (see (C) in FIG. 10). A control circuit is provided to the transmitter-receiver 100, and the control circuit performs processing such as receiving commands, optical switch switching setting processing, setting the distortion correcting mechanism, setting the signal light wavelength, checking the result of performance check, and the like. Further, with the exemplary embodiment, the actual signals are transmitted also to the systems in a standby state.

The receiving section 102 resets each setting that is optimized until then for receiving the signals in the standby state (see (D) in FIG. 10). Thereafter, optimization of the part that is irrelevant to the distortion correction is executed from the inputted signal light, and that state is fixed (see (E) in FIG. 10). The optimization of each part depends on the signal wavelength in many cases, so that the wavelength of the signal light outputted from the transmitting section 101 is set to be the same as the signal wavelength of the signals the receiving section 102 actually receives. When there is no "part irrelevant to distortion correction" that requires optimization, the process of (E) is omitted. Then, the first "performance checkup" is executed (see (F) in FIG. 10). When there is no problem (OK) in the "performance checkup", it is shifted to a state for executing the processes of (G) and thereafter. When there is a problem (NG) in the "performance checkup", an alarm is generated (see (U) in FIG. 10).

When the process of (F) is OK, distortion is intentionally generated for the input signal light that has no waveform distortion by using each distortion correcting mechanism of the receiving section 102, and the analog property of the transmitter-receiver 100 and the actions of both distortion correcting mechanisms (1), (2) are checked (see (G)-(N) in FIG. 10). When the distortion correcting mechanism is a wavelength dispersion compensator, the performance checkup is conducted under setting of each of the dispersion values (n values for the distortion correcting mechanism (1) and m values for the distortion correcting mechanism (2) in the case shown in FIG. 10). When there is a problem (NG) in the "performance checkup", an alarm is generated (see (U) in FIG. 10). When the performance checkup is conducted by using the distortion correcting mechanisms, the mechanism other than the performance-checkup target distortion correcting mechanism is so set ("reset" in FIG. 10) that the influence thereof becomes the minimum (see (J) and (N) in FIG. 10).

When the performance checkup executed by using each of the distortion correcting mechanism is completed, it is considered that the performance check for the time being is finished (see (O) in FIG. 10). In order to return to the state where the actual signals are transmitted in the standby state, the light outputted from the transmitting section 101 is sent out to the transmission path, by the control circuit, and the optical switches (the optical switches 111 and 112 in the structure shown in FIG. 9) inside the transmitter-receiver 100 are so switched that the receiving section 102 receives the signal light transmitted from the transmission path (see (P) in FIG. 10).

When the signal light is inputted to the receiving section 102, the control circuit performs the processing for optimizing each of the distortion correcting mechanisms by referring to each setting in the process of (A) in order to optimize the quality of the signals after being transmitted (see (Q) and (R) in FIG. 10). Further, as necessary, optimization of the "part irrelevant to distortion correction" that requires optimization is conducted (see (S) in FIG. 10).

Between the process of (E) and the process of (S), the setting of "part irrelevant to distortion correction" is fixed. The setting is fixed in order to simplify the control method and to improve the accuracy when optimizing each of the distortion correcting mechanisms. Further, after completing the procedure up to the process of (S), the control circuit checks the transmission quality of that time. When there is no problem (OK), the control circuit continues the standby state. When there is a problem (NG), the control circuit generates an alarm. The above is a series of procedures for checking the performance.

Next, the specific method of the performance checkup will be described.

Basically, the performance checkup is based on a method which compares data acquired every performance checkup with some kind of reference data, and generates an alarm when a difference therebetween exceeds a certain range. The reference data is data acquired under a same condition at the time of shipment from factories, at the time of employing the device, or at the time of previous performance check, for example. In general, it is preferable to compare the data with the data that is acquired at the time of shipment from factories.

Hereinafter, a specific method for acquiring the data for making comparison will be described. If the signal light transmitted from the transmitting section 101 is inputted to the receiving section 102 without any distortion or attenuation, an error-free state is simply accomplished unless there are a considerable amount of faults being generated. Thus, it is possible to check the actions of the digital section used within the transmitter-receiver 100. However, it is not possible to sufficiently check the performance of the analog sections such as ultrahigh-speed electronic components and optical components requiring fine adjustment used within the transmitter-receiver 100 by simply inputting the signal light to the receiving section 102 from the transmitting section 101.

As an effective method for checking the performance of the analog sections, there is a method of writing eye masks by using a data discriminator within the receiving section 102 as shown in FIG. 11. That is, there is a method which variously changes the discriminating phase and discriminating level of the data discriminator to write out an area (for example, an error free area in the case of the exemplary embodiment) which satisfies a certain code error rate. The eye-mask shape is influenced by the change in the performance of the analog components. Thus, writing the eye-mask shapes and having the control circuit or the like observe the eye-mask shapes is effective for detecting the performance changes in the analog components. However, it takes a long time to acquire precise eye-mask shapes. Considering there are numbers of performance checkups conducted in one-time performance check, it is preferable to complete the performance checkup by checking the error-free accomplishment degree at typical several points set in advance, as shown in FIG. 12. In FIG. 11 and FIG. 12, circle marks indicate the points that can be the targets for the performance check. Among those, white circle marks are the points to be the targets for the actual performance check.

Further, there are cases where analog performance degradation appears prominently when distortion is added to the signals actively. There are mainly two methods for giving distortion to the signal light. One is a method that can be performed when a distortion correcting function is built-in to the receiving section 102, with which distortion is given to the signal light by changing the setting thereof. The other is a method which inserts a distortion element to the loopback circuit.

One of the methods, which is the method actively using the distortion correcting function, cannot perform proper performance checkup when the performance of the distortion correcting mechanism itself is deteriorated. However, considering that the distortion correcting mechanism itself is a part of the transmitter-receiver 100, there is a low possibility of overlooking the occurrence of a problem in the transmitter-receiver 100 caused due to the deterioration in the performance of the distortion correcting mechanism itself. The procedure shown in FIG. 10 is based on the method which uses the variable property of the distortion correcting mechanism.

The other method which inserts the distortion element to the loopback circuit is particularly effective for a case where the distortion correcting mechanism having the variable property is not provided inside the transmitter-receiver 100. In the case shown in FIG. 13, a fixed wavelength dispersion element 130 is inserted to the section of the loopback circuit 120. The inserted wavelength dispersion element 130 is inserted in order to utilize such tendency that the performance change in the analog components easily appears more prominently when the eye mask is extracted for the waveform that is distorted with respect to the wavelength dispersion. Other than that, there is also considered a method which degrades the final signal-to-noise ratio by simply inserting an optical attenuator to the loopback circuit 120. It is not preferable for the reference signal light to have distortion, when executing the process of (E) which is to "optimize and fix part irrelevant to distortion correction" in the procedure shown in FIG. 10.

FIG. 14 is a block diagram showing the structure of the transmitter-receiver which uses an optical switch (one-to-many optical switch) that outputs a single input to one of the three or more (three in the case shown in FIG. 14) output sides as the optical switch 111, and uses an optical switch (one-to-many optical switch) that outputs one of three or more (three in the case shown in FIG. 14) inputs to a single output side as the optical switch 112. The use of the one-to-many optical switches for the optical switches 111 and 112 makes it possible to achieve the loopback circuit 120 having various functions including a direct connecting function without giving a variable mechanism to the signal degradation element. For example, the use of the structure as shown in FIG. 14 as an example makes it possible to generate various signal distortions including "no distortion". In the case shown in FIG. 14, a direct-connection loopback path and a loopback path having the wavelength dispersion function by the wavelength dispersion element 130 can be achieved.

Other than the cases shown in FIG. 13 and FIG. 14, there are considered various kinds of variations in regards to the structure of the loopback circuit 120, e.g., a structure in which various kinds of signal degradation elements are connected in series. It is desirable for the loopback circuit 120 to be designed in accordance with the characteristic of the transmitter-receiver. In FIG. 13 and FIG. 14, the loopback circuit 120 is a part corresponding to the part from the output section of the optical switch 112 to the input section of the optical switch 111.

As described above, with the exemplary embodiment, the performance of the transmitter-receiver 100 even after employing the optical communication transmission system can be accurately grasped on a regular basis. Thus, the possibility of being able to avoid in advance the faults of the transmitter-receiver 100 caused due to the performance degradation generated according to the chronological changes is increased, which results in improving the reliability of the optical communication transmission system.

Further, when a fault that may cause transmission quality degradation occurs, it is possible to easily detect where (the two transmitter-receivers 100 disposed at both ends of the transmission path (see FIG. 2), the transmission path) the main factor thereof is. That is, when the occurrence of the fault is detected, it can be judged that the main factor of the fault is at the transmitter-receiver 100 disposed at one end when the quality degradation is found at the transmitter-receiver 100 disposed on one end of the transmission path. It can be judged that the main factor of the fault is at the transmitter-receiver 100 disposed at the other end when the quality degradation is found at the transmitter-receiver 100 disposed on the other end of the transmission path. It can be judged that the main factor of the fault is at the transmission path when the quality degradation is not found at the two transmitter-receivers disposed at both ends.

Further, when using the transmission method which employs the receiving section 102 that requires adjustment in many sections for implementing an appropriate receiving state, the receiving section 102 can be adjusted in advance for the signals with no degradation. Thus, the time required for optimizing the actually transmitted signals can be shortened, and the accuracy of the optimization can be improved as well.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application is the National Phase of PCT/JP2008/066844, filed Sep. 18, 2008, which claims the Priority right based on Japanese Patent Application No. 2007-243820 filed on Sep. 20, 2007, and the disclosure thereof is hereby incorporated by reference in its entirety.

INDUSTRIAL APPLICABILITY

The present invention is preferably applied to the optical communication transmission system in which signal light is transmitted among a plurality of optical transmitter-receivers via an optical transmission path.

Figure 1:
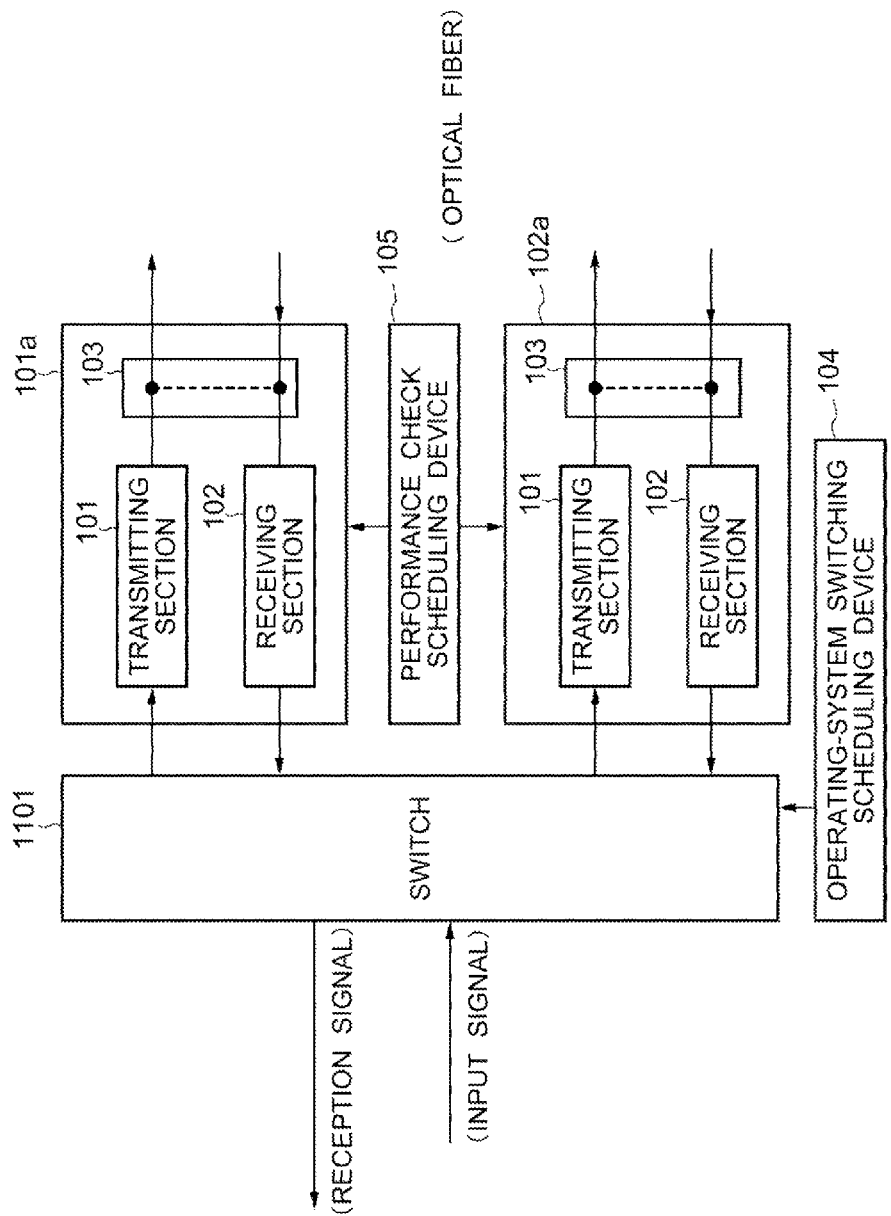
FIG. 1 is a block diagram showing a schematic structure of an optical transmitter-receiver in an optical communication transmission system according to the present invention.
Figure 2:
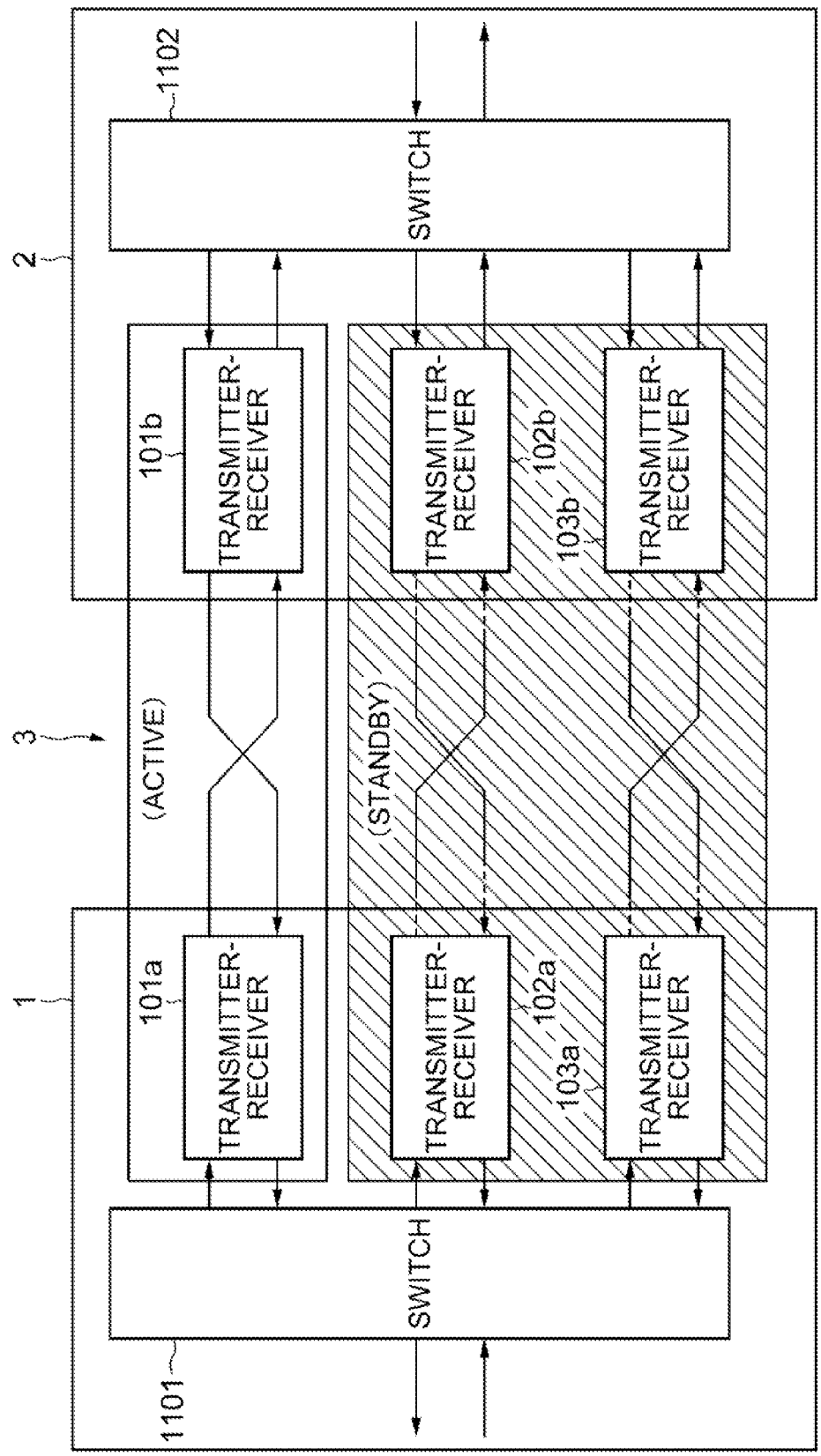
FIG. 2 is a block diagram showing a typical structure of a backbone optical communication transmission system.
Figure 3:
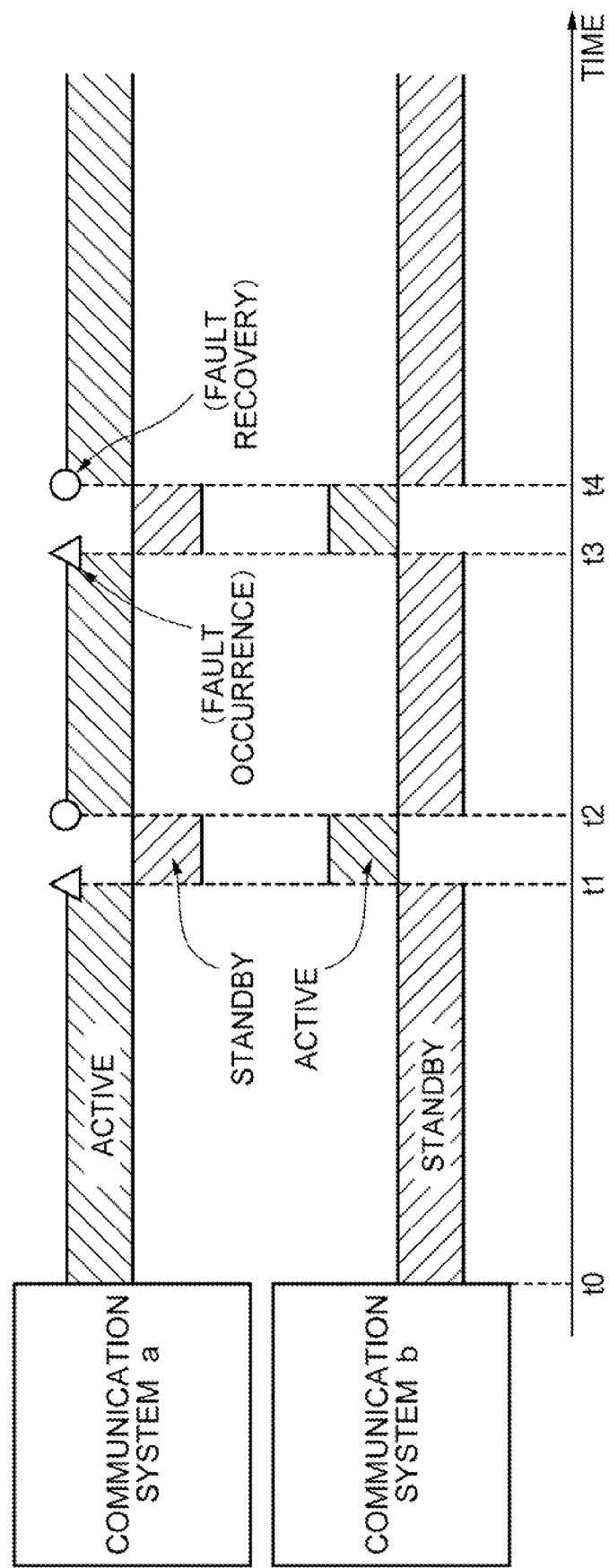
FIG. 3 is an explanatory diagram showing an example of switching timings of the transmission system using two systems.
Figure 4:
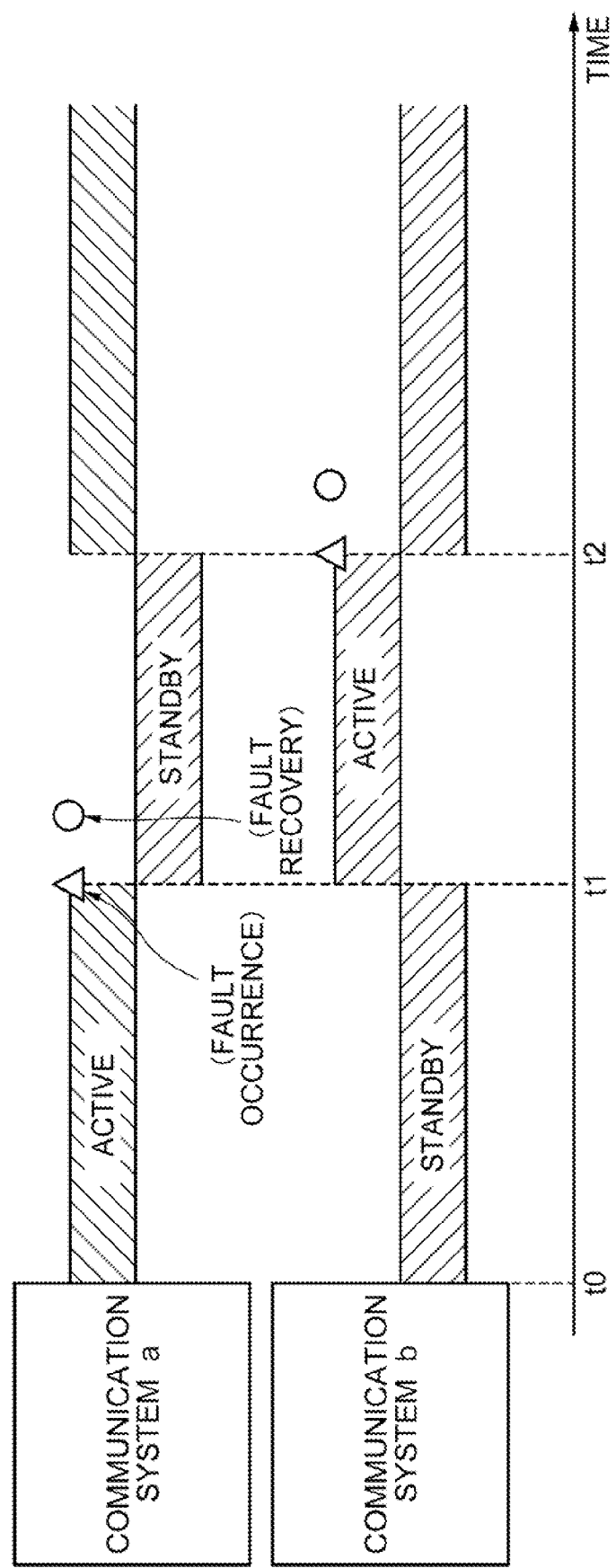
FIG. 4 is an explanatory diagram showing another example of switching timings of the transmission system using two systems.
Figure 5:
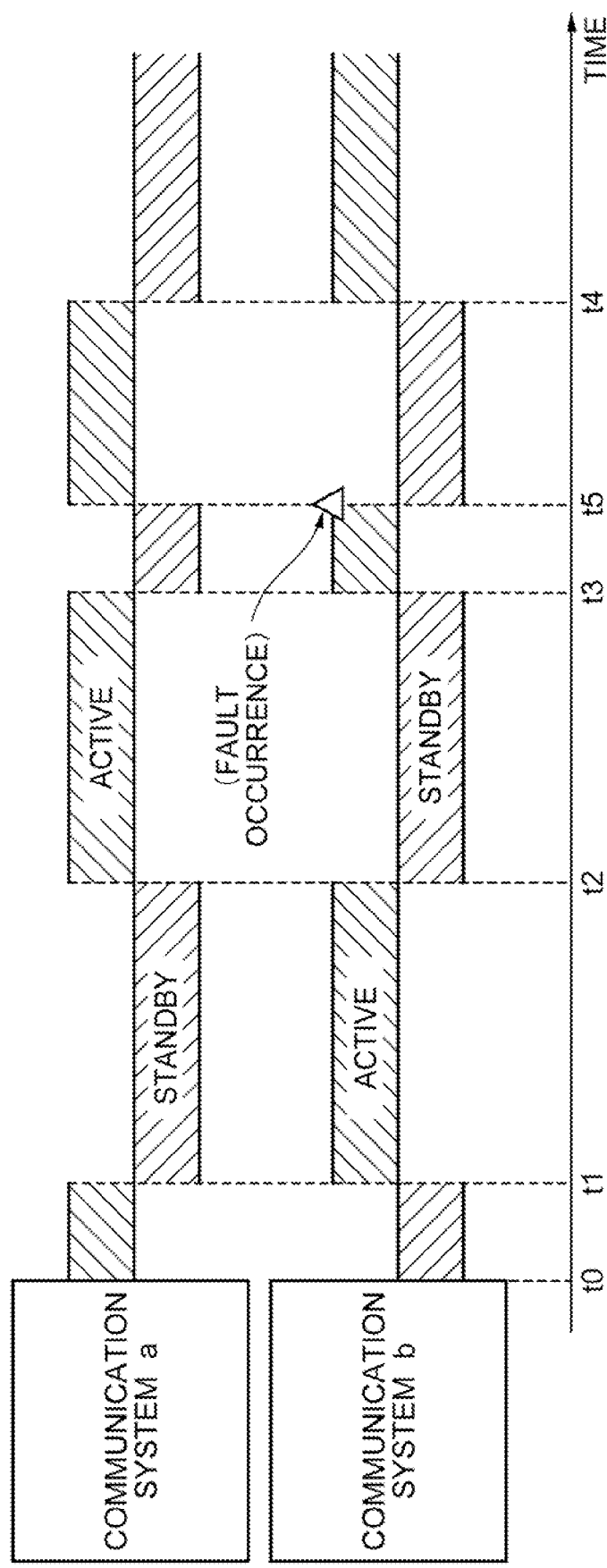
FIG. 5 is an explanatory diagram showing still another example of switching timings of the transmission system using two systems.
Figure 6:
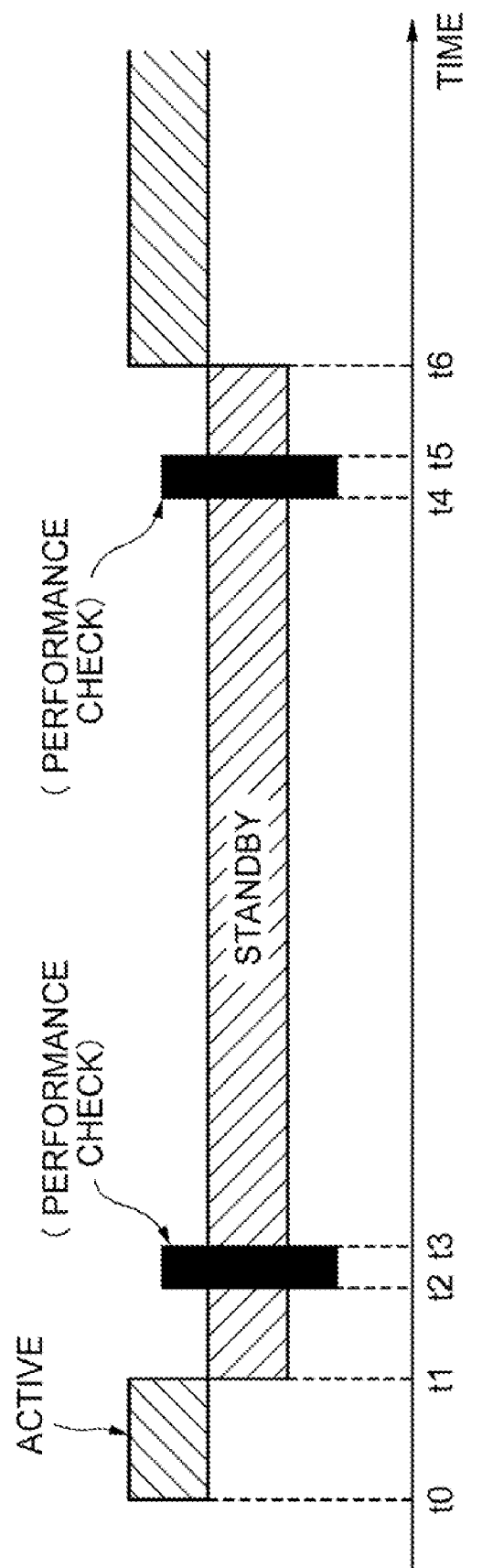
FIG. 6 is an explanatory diagram showing timings for executing performance check in the transmission system according to the exemplary embodiment.
Figure 7:
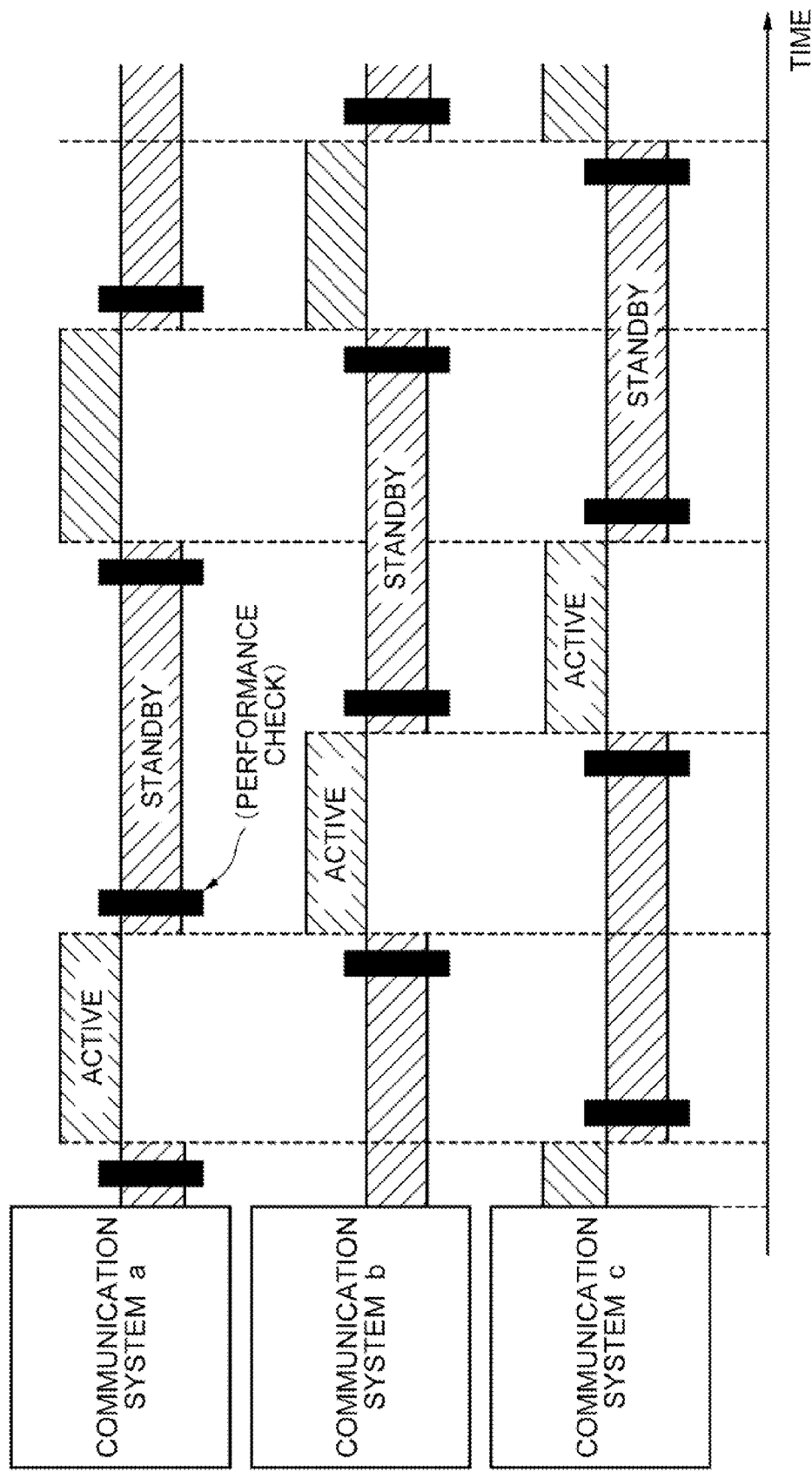
FIG. 7 is an explanatory diagram showing timings for active-standby switching and performance check in a case of using three system.
Figure 8:
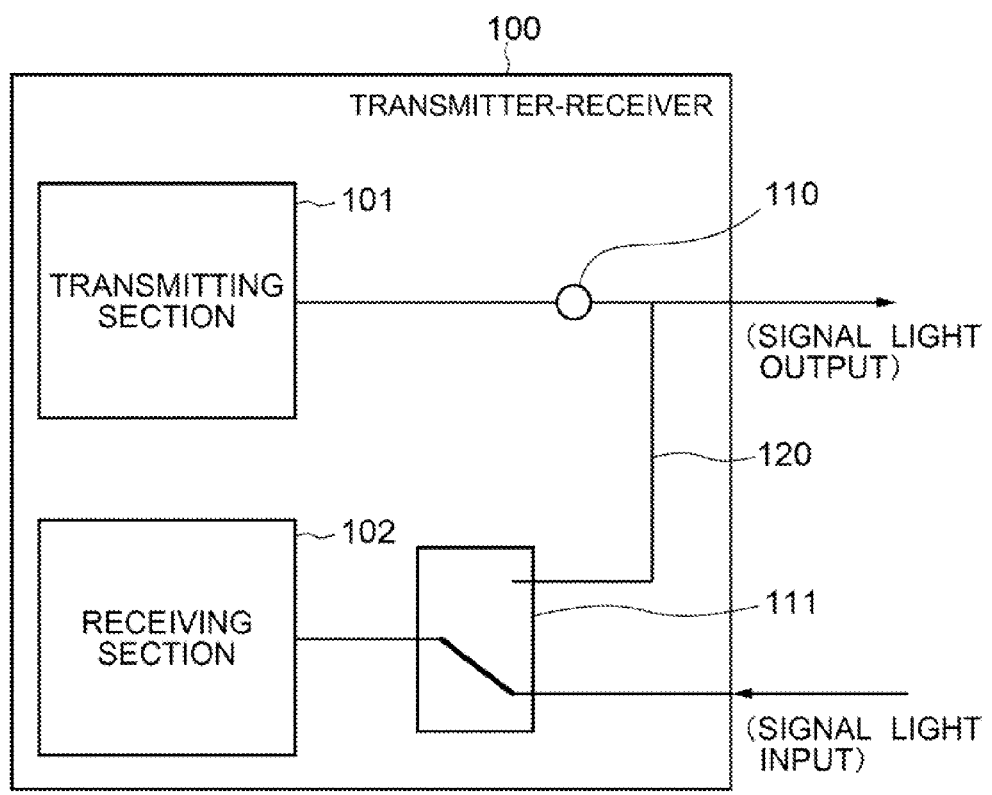
FIG. 8 is a block diagram showing the structure of the transmitter-receiver of the transmission system according to the exemplary embodiment.
Figure 9:
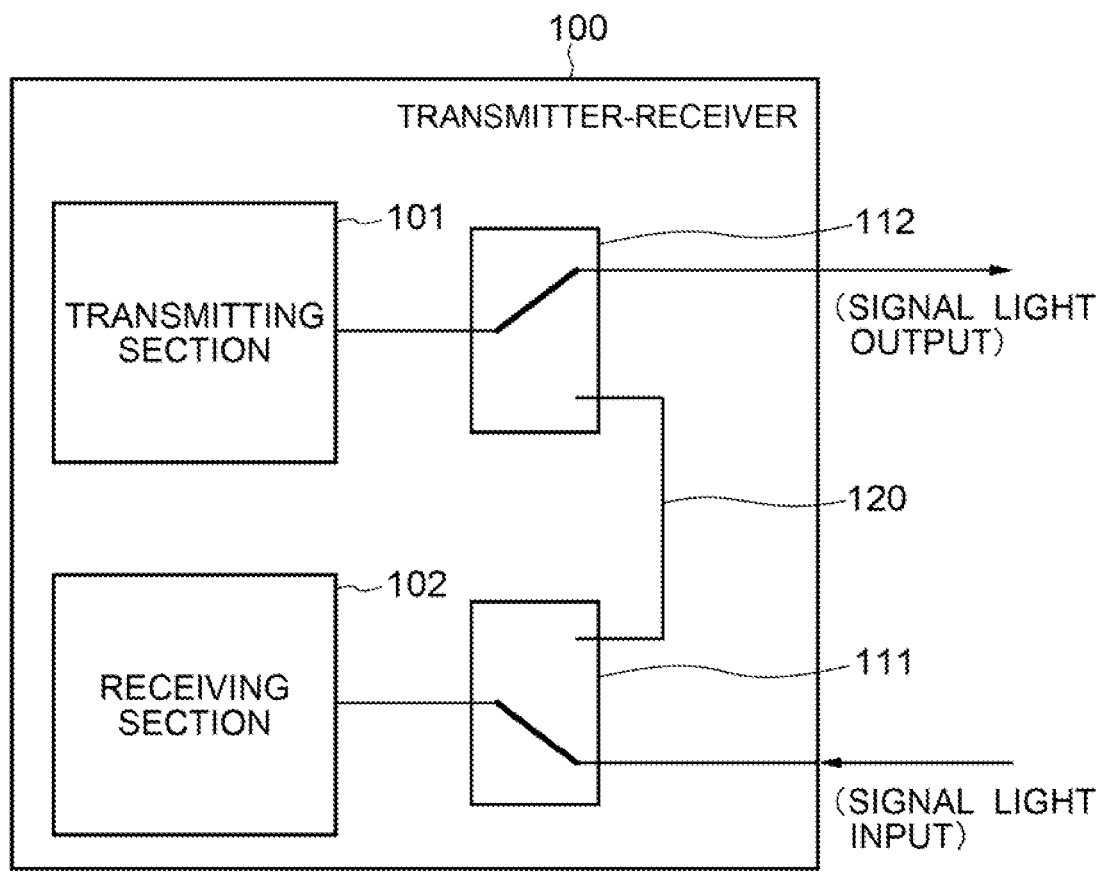
FIG. 9 is a block diagram showing another example of the structure of the transmitter-receiver of the transmission system according to the exemplary embodiment.
Figure 10:
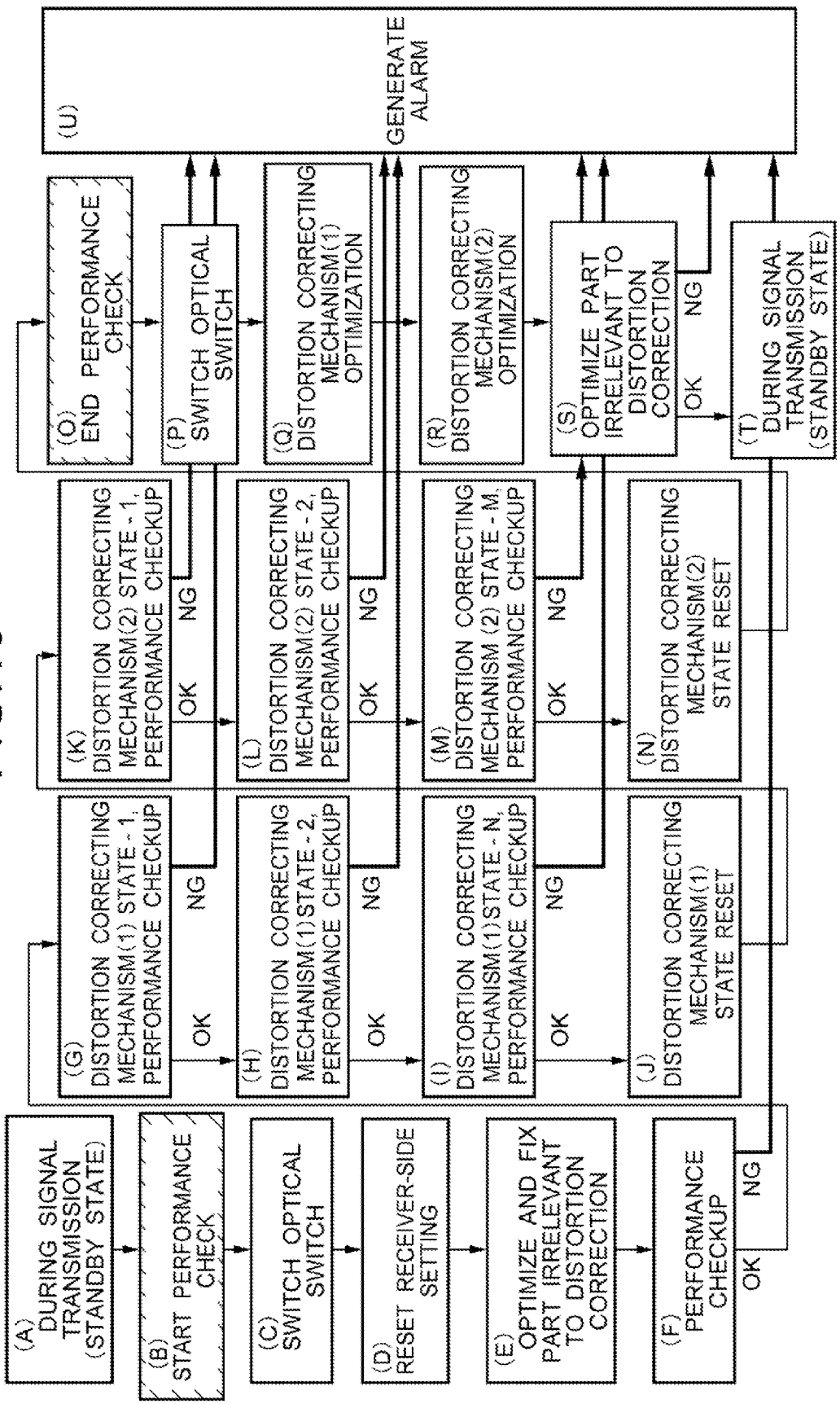
FIG. 10 is a flowchart showing the procedure of performance check according to the exemplary embodiment.
Figure 11:
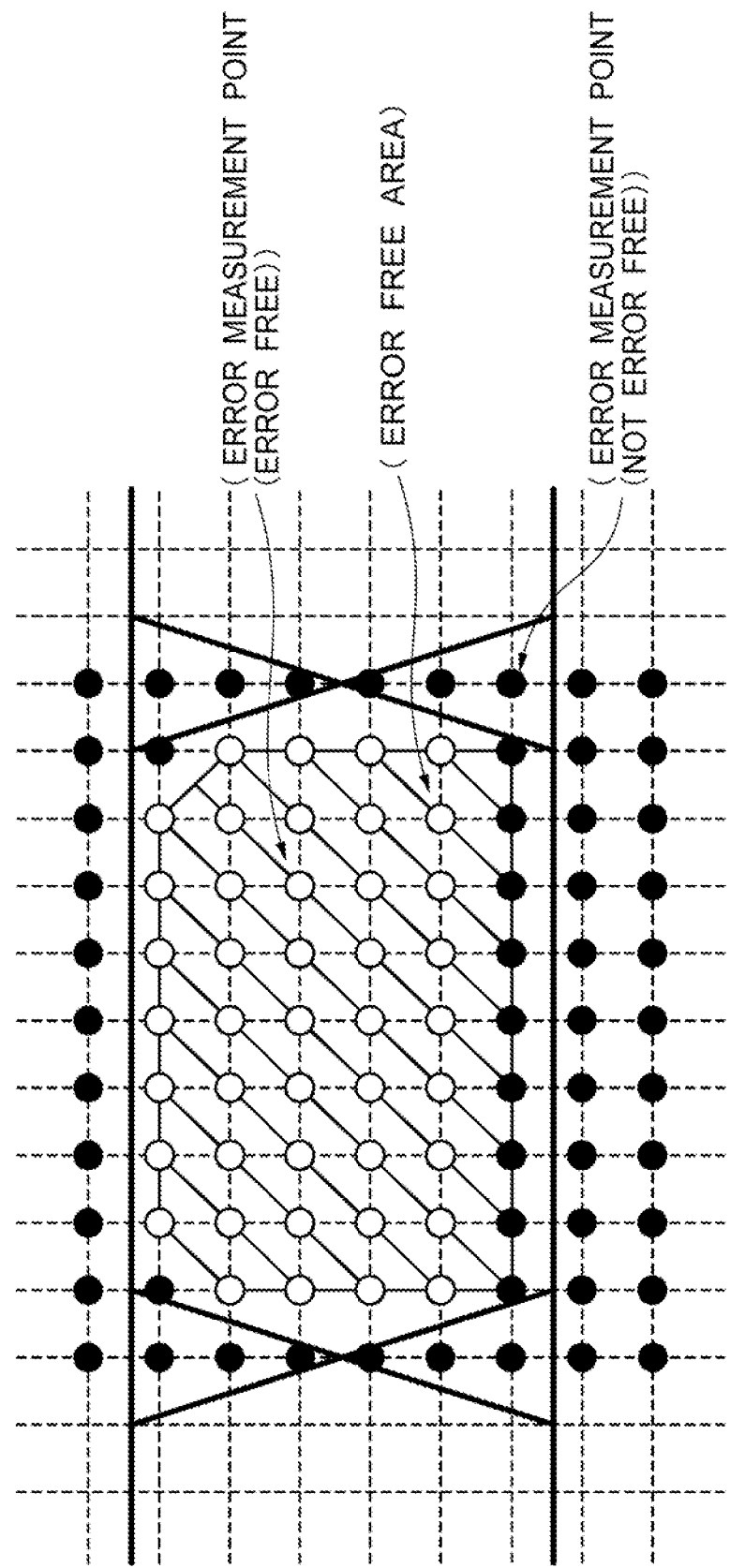
FIG. 11 is an explanatory diagram for describing eye masks.
Figure 12:
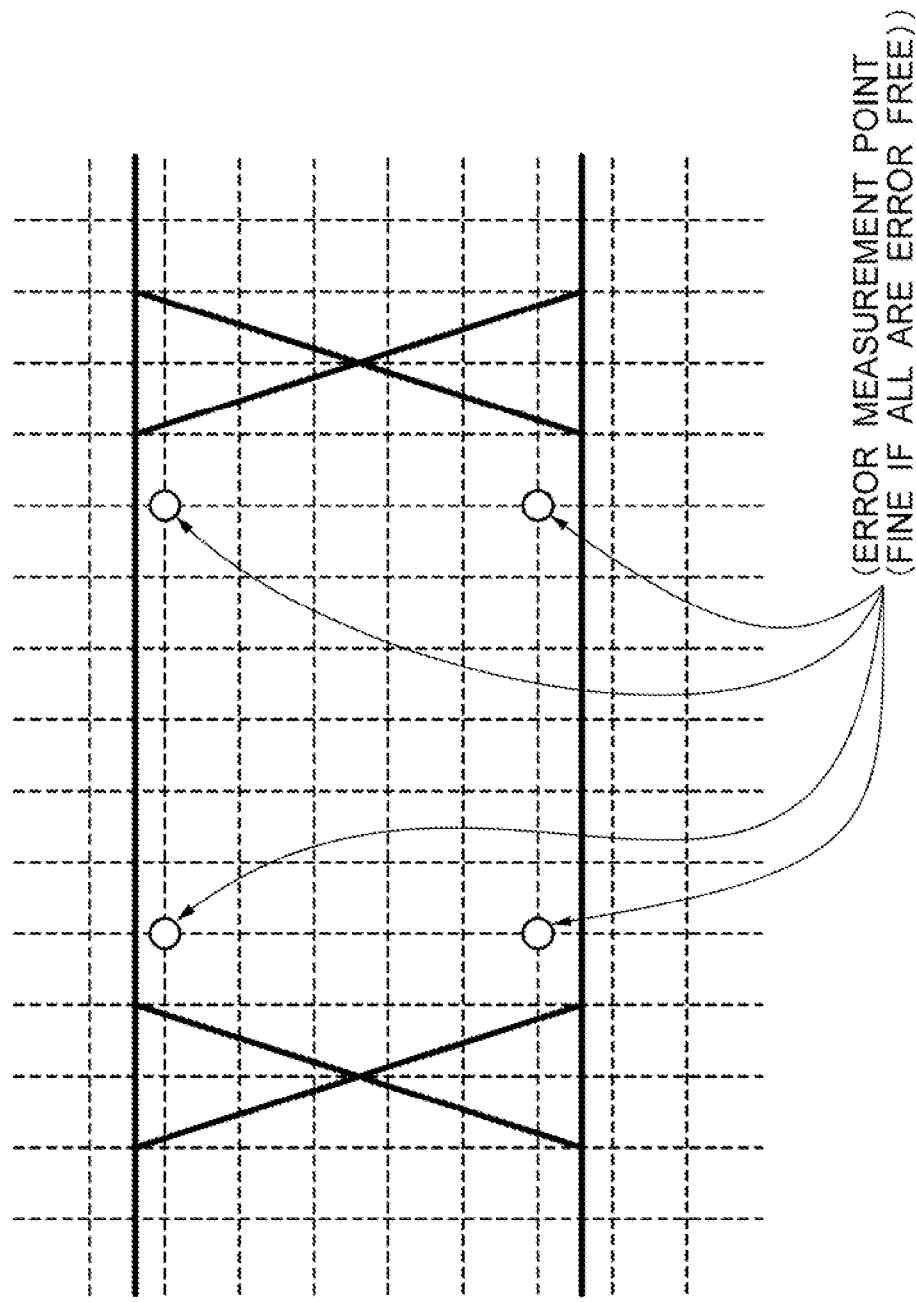
FIG. 12 is an explanatory diagram for describing a simple eye mask making method.
Figure 13:
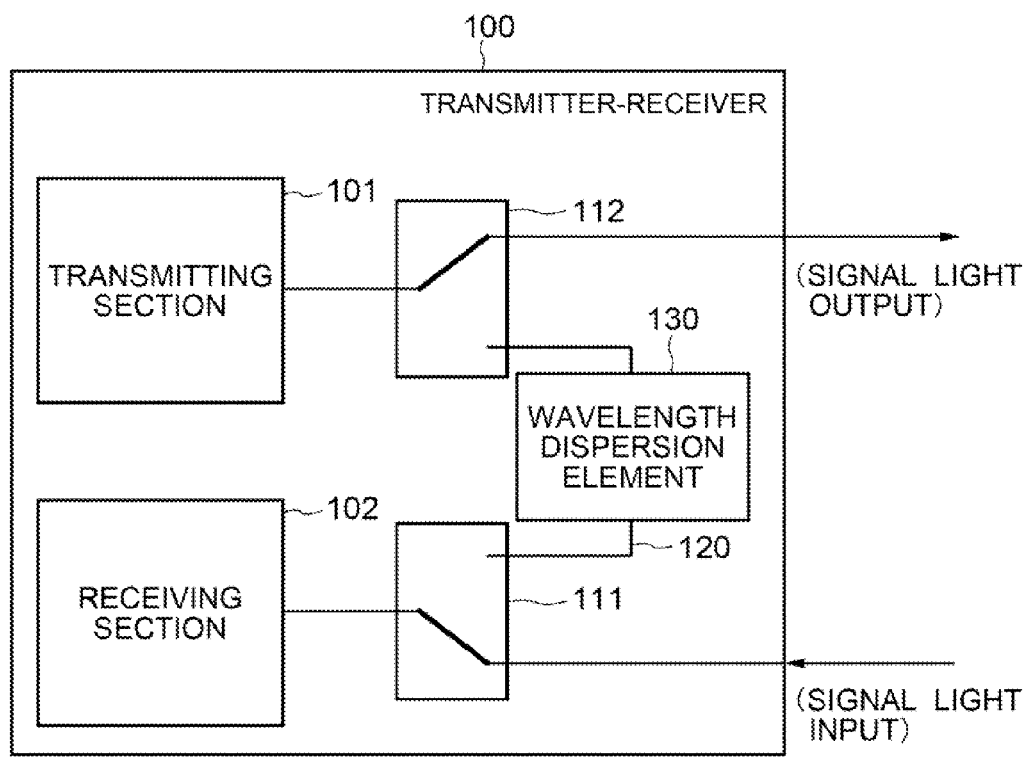
FIG. 13 is a block diagram showing still another example of the structure of the transmitter-receiver of the transmission system according to the exemplary embodiment.
Figure 14:
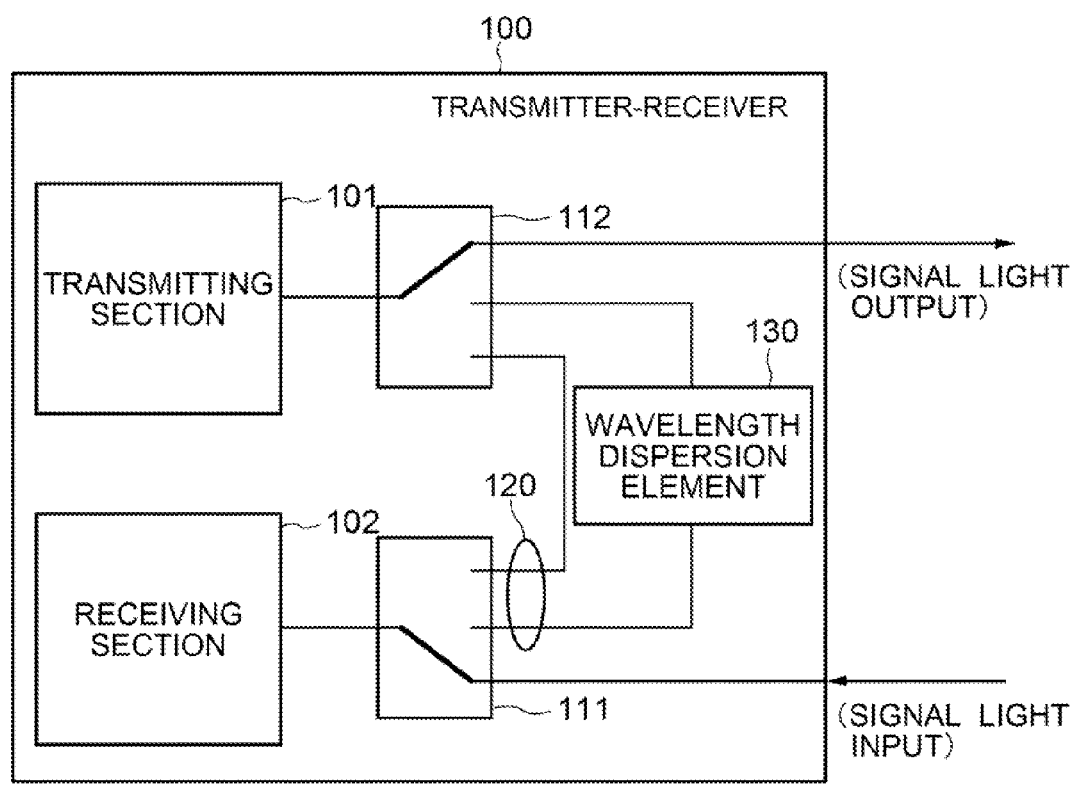
FIG. 14 is a block diagram showing another example of the structure of the transmitter-receiver of the transmission system according to the exemplary embodiment.

REFERENCE NUMERALS 1, 2 Optical transmission device
100 Transmitter-receiver (optical transmitter-receiver)
101a, 102a, 103a, 101b, 102b, 103b Optical transmitter-receiver
101 Transmitting section
102 Receiving section
103 Loopback device
104 Operating-system switching scheduling device
105 Performance check scheduling device
110 Optical coupler
111, 112 Optical switch
120 Loopback circuit
130 Wavelength dispersion element
1101, 1102 Switch

The invention claimed is:

1. An optical communication transmission system having a redundant structure of three or more systems in which one of optical transmitter-receivers is an operating-system optical transmitter-receiver and the other optical transmitter-receivers are standby-system optical transmitter-receivers, the optical communication transmission system comprising:
a loopback device which inputs signal light of a transmitting section of the optical transmitter-receiver to a receiving section thereof;
an operating-system switching scheduling device which switches the operating-system transmitter-receiver and the standby-system optical transmitter-receiver; and
a performance check scheduling device which operates the loopback devices of the two or more standby-system optical transmitter-receivers at prescribed different timings set in advance so as not to overlap with each other, and starts performance check processing by the transmitting sections and the receiving sections of the optical transmitter-receivers.

2. The optical communication transmission system as claimed in claim 1, wherein
the operating-system switching scheduling device switches the operating-system optical transmitter-receiver and one of the two or more standby-system optical transmitter-receivers regularly.

3. The optical communication transmission system as claimed in claim 1, wherein
the receiving section of the optical transmitter-receiver includes a device which requires an adjustment that is irrelevant to distortion correction of the signal light, and performs the adjustment of the device with the performance check processing.

4. The optical communication transmission system as claimed in claim 1, wherein the loopback device comprises:
   a plurality of loopback paths including a direct-connection path; and
   an optical switch for selecting one of the plurality of loopback paths.

5. The optical communication transmission system as claimed in claim 4, wherein
   the plurality of loopback paths include a path having a waveform degradation element.

6. A method for checking performance of an optical communication transmission system having a redundant structure of three or more systems in which one of optical transmitter-receivers is an operating-system optical transmitter-receiver and the other optical transmitter-receivers are standby-system optical transmitter-receivers, the method comprising:
   operating loopback devices of the two or more standby-system optical transmitter-receivers at prescribed timings set in advance, and starting performance check processing by the transmitting sections and the receiving sections of the optical transmitter-receivers in such a manner that the performance check processing in each of the standby-systems do not overlap with each other in terms of time.

7. The method for checking performance of the optical communication transmission system as claimed in claim 6, wherein
   the operating system and one of the standby systems not undergoing the performance check processing are switched regularly.

8. The method for checking performance of the optical communication transmission system as claimed in claim 6, the optical transmission system comprising a device that requires an adjustment irrelevant to distortion correction of signal light, which is provided to the receiving section of the optical transmitter-receiver, wherein
   the adjustment of the device is performed in a process of the performance check processing.

9. An optical communication transmission system having a redundant structure of three or more systems in which one of optical transmitter-receivers is an operating-system optical transmitter-receiver and the other optical transmitter-receivers are standby-system optical transmitter-receivers, the optical communication transmission system comprising:
   loopback means for inputting signal light of a transmitting section of the optical transmitter-receiver to a receiving section thereof;
   operating-system switching scheduling means for switching the operating-system transmitter-receiver and the standby-system optical transmitter-receiver; and
   performance check scheduling means for operating the loopback means of the two or more standby-system optical transmitter-receivers at prescribed different timings set in advance so as not to overlap with each other, and starts performance check processing by the transmitting sections and the receiving sections of the optical transmitter-receivers.

\* \* \* \* \*